United States Patent [19]

Oswald et al.

[11] 4,406,057
[45] Sep. 27, 1983

[54] METHOD OF MAKING LEAD-ACID BATTERY ELEMENT STACK

[75] Inventors: Thomas L. Oswald, Roseville; David L. Lund, Minneapolis, both of Minn.

[73] Assignee: GNB Batteries Inc., Mendota Heights, Minn.

[21] Appl. No.: 245,795

[22] Filed: Mar. 20, 1981

[51] Int. Cl.³ .......................................... H01M 10/04
[52] U.S. Cl. .................................. 29/623.4; 29/623.1
[58] Field of Search ..................... 429/131, 153, 162; 29/623.1, 730, 623.4; 53/157, 399, 429, 474

[56] References Cited

U.S. PATENT DOCUMENTS

| | | | |
|---|---|---|---|
| 2,654,794 | 10/1953 | Zaugg | 429/154 |
| 2,667,527 | 1/1954 | Pucher | 429/118 |
| 2,851,509 | 9/1958 | Di Pasquale et al. | 429/131 |
| 2,851,511 | 9/1958 | Bikerman | 429/131 |
| 3,856,575 | 12/1974 | Hughes | 429/164 |
| 3,920,477 | 11/1975 | Alaburda | 429/162 |
| 3,941,615 | 3/1976 | McDowall | 429/149 |
| 4,022,951 | 5/1977 | McDowall | 429/149 |
| 4,029,855 | 6/1977 | Dougherty et al. | 429/82 |
| 4,051,304 | 9/1977 | Snook | 429/94 |
| 4,239,839 | 12/1980 | McDowall et al. | 429/154 |

FOREIGN PATENT DOCUMENTS

| | | |
|---|---|---|
| 49-116530 | of 1974 | Japan . |
| 50-118559 | 8/1975 | Japan . |
| 51-102103 | of 1976 | Japan . |
| 54-4047 | 3/1979 | Japan . |

*Primary Examiner*—Francis S. Husar
*Assistant Examiner*—Jonathan L. Scherer
*Attorney, Agent, or Firm*—Augustus J. Hipp

[57] ABSTRACT

An element stack and a method of making same is provided in which assembling a relatively large number of relatively small electrode plates into an element stack is facilitated by positioning a first set of electrode plates onto a strip of separator material in pre-selected locations and then affixing such plates to the strip. The resulting product may then be readily processed into the element stack by insertion of a second set of electrode plates of opposite polarity to the first set and then folding the separator in accordion fashion. The assembly method is amenable to automation and the resulting cell element stack may be handled as a unit thereby facilitating battery assembly.

9 Claims, 10 Drawing Figures

METHOD OF MAKING LEAD-ACID BATTERY ELEMENT STACK

CROSS REFERENCE TO RELATED APPLICATION

Klang and Rao, Ser. No. 352,924, filed Feb. 26, 1982 for: Lead-Acid Battery and Method of Making Same, a continuation-in-part of Klang and Rao, Ser. No. 245,772, filed Mar. 20, 1981 for: Lead-Acid Battery and Method for Making Same, now abandoned.

The present invention relates to storage batteries, and, more particularly, to a facile method of assembling cell element stacks for such batteries and to the element stacks themselves.

The last several years have seen a number of developments in the lead-acid battery field for starting, lighting and ignition (hereinafter "SLI") applications, perhaps the most significant of which is the maintenance-free battery. Ideally, this type of battery allows use over its service life without the need for any maintenance, such as adding water or the like. The popularity of the maintenance-free battery for SLI applications is widespread at the present time.

However, the battery industry is continually being faced with seemingly ever-increasing demands. There is thus considerable pressure on automobile manufacturers to provide improved performance, e.g.—better gas mileage; and this has been translated to substantial efforts to reduce the overall weight of the automobile as much as possible. Lighterweight batteries are likewise being required so as to contribute to such weight reductions. Similarly, there is a tendency for requiring a smaller-sized battery, simply due to the seemingly ever-reducing amount of space available under the automobile hood for the battery.

At the same time, the number of smaller-sized automobiles with smaller engines currently in service has risen dramatically. While the batteries used for such smaller automobiles can be smaller, the designs required need to be more efficient. Thus, for example, reducing a 350 cubic inch engine to one-half that size does not allow reducing the battery performance requirements to the same extent. The starting or cranking power, as one example, which is required for such a smaller engine is thus more than one-half of the requirements for the 350 cubic inch engine. Moreover, four cylinder engines require substantially higher cranking speed to attain engine starting. Indeed, some four cylinder engines require up to one and one-half to three times the cranking speeds of V-8 engines.

The increase in popularity of diesel-powered automobiles has also contributed to the demand for more efficient batteries. Engines of this type thus require more starting power than a comparably sized gasoline-powered engine. As a result, it is not unusual to see a diesel-powered automobile employ two batteries in parallel or utilize an extremely large battery, almost approaching a truck battery size.

These and other considerations dictate that battery manufacturers provide a battery with substantially improved performance characteristics. This need has engendered considerable attention.

Substantial effort has thus been directed to enhancing performance of present battery designs by attempts to improve individual components. One example of this is various efforts to provide improved performance by modifying the grid design. U.S. Pat. Nos. 4,118,553, 4,221,852 and 4,221,854 are specific examples. While perhaps providing some improvement, batteries incorporating such grid designs fall far short of satifying the ever-increasing requirements being faced by battery manufacturers.

Another attempt to reduce the weight of a battery comprises the use of a plurality of frames, each divided into a numer of side-by-side positive and negative active paste support areas. These frames are assembled and secured together in a stack configuration so that the perimeter portions of the frames serve as the top, bottom and two opposite sides of the battery; and the divisions in the frames serve as cell partitions. Each frame is pasted with active material to provide plates, with adjacent plates in each frame being of opposite polarity, and adjacent plates in adjoining frames also being of opposite polarity. This type of battery construction is exemplified in U.S. Pat. No. 4,022,951 to McDowall.

Such a battery construction is said to reduce the battery weight and size considerably as well as to eliminate the formation of intercell connections during assembly, with the avoidance of sealing problems, as well as the possible elimination of the requirement for a separate battery case.

However, this type of battery construction is not amenable to conventional battery assembly techniques. Uitilization would thus require new and different assembly equipment, creating both a considerable capital investment as well as the necessity of gaining knowledge as to what is required from the quality control standpoint. Moreover, it would be difficult, if not impossible, to make the combination positive and negative grids from different alloy materials. As is known, the use of hybrid grids for maintenance-free batteries is often desirable, or even necessary, in some applications. Still further, a joined positive and negative grid type of construction would make it quite difficult to automate the pasting of active materials to the grids while using separate paste formulations for the positive and negative plates, as is generally practiced. It would also seem difficult to maintain satisfactory electrolyte-tight sealing throughout the service life because of the considerable area of the frames which must be heat-sealed together and the number and type of cell-to-cell connections which are necessary. Thus, in this type of construction, the area which must be heat-sealed could well be about 25 to 50 times that a required for the cover-to-container seal in a conventional battery design. No battery manufacturer has been able to demonstrate, on a commercial scale, the reliability that would be required to carry out a heat-sealing operation of this magnitude.

The McDowall type of combination positive-negative plate construction is representative of the approach wherein cell-to-cell connection is obtained by the combination plate support member in one cell extending through the partition and serving as the same support member of the plate of opposite polarity in an adjoining cell. All of such approaches would require relatively complex assembly techniques when considering commercial production.

Still further, prior patents and literature in the battery field are replete with a multitude of configurations and theories for providing improved battery performance by reducing the internal resistance. Yet, despite all this substantial prior effort, there still remains the need for a relatively lightweight, small volume battery which can be reliably made on a commercial production basis while providing the ever-increasing performance characteristics being demanded. Stated another way, there still exists a need for a battery which can reliably be made on a high volume, production basis which is characterized by a high cranking power to weight and volume ratio, e.g.—starting power for an automobile, while maintaining the other characteristics required to provide an SLI battery with a satisfactory useful service life.

The co-pending Klang et al application identified herein provides a battery, having improved performance characteristics, satisfying this need. However, the illustrative embodiment utilizes a relatively large number of relatively small plates which may range in number up to about 72 plates per cell or perhaps more. High volume commercial production thus makes it highly desirable to provide an efficient method for assembling these many components into a cell element stack, viz.—the required number of alternately disposed, and properly positioned, positive and negative electrode plates with an appropriate separator separating adjacent positive and negative plates.

A principal object of the present invention is thus to provide an efficient method for assembling a cell element stack for lead-acid batteries.

A further object of this invention provides a method for assembly of a cell element stack which is amenable to high volume, commercial production. A related and more specific object is to provide a method for assembly of a cell element stack which may be readily automated.

Yet another object lies in the provision of an assembled cell element stack which may be readily handled in subsequent battery assembly steps.

A still further object of the is invention is to provide a method for assembly of a cell element stack in which the desired alignment of the components of the cell element stack are provided and are retained after assembly.

Other objects and advantages will be apparent from the accompanying drawings, in which.

While the invention will be described in connection with preferred embodiments, it will be understood that we do not intend to limit the invention to these preferred embodiments. On the contrary, we intend to cover all alternatives, modifications, and equivalents as may be included within the spirit and scope of the present invention as defined in the appended claims. Thus, while the present invention will be described in conjunction with assembling a cell element stack for a SLI automotive battery, it should be appreciated that the invention is equally applicable to assembling cell element stacks for any other lead-acid battery application. Indeed, use of the present invention will be particularly advantageous for any application in which a relatively large number of electrode plates need to be combined to form a cell element.

In general, the present invention provides a method for assembling a cell element stack in which a first set of electrode plates is placed in a preselected position on an appropriately sized separator and then secured in such position to the separator. The resulting product may then be processed as desired to make the cell element stack. Typically, facilitated by the securing to the separator material of the first set of electrode plates, the separator may then be folded in accordion fashion to provide areas for insertion of a second set of electrode plates of opposite polarity to the first set and then inserting the second set of electrode plates into position. The resulting cell element stack can then be subjected as a unit to whatever further processing may be required, thereby greatly simplifying battery assembly and handling. Moreover, this method is readily amenable to automation.

Figure 1:
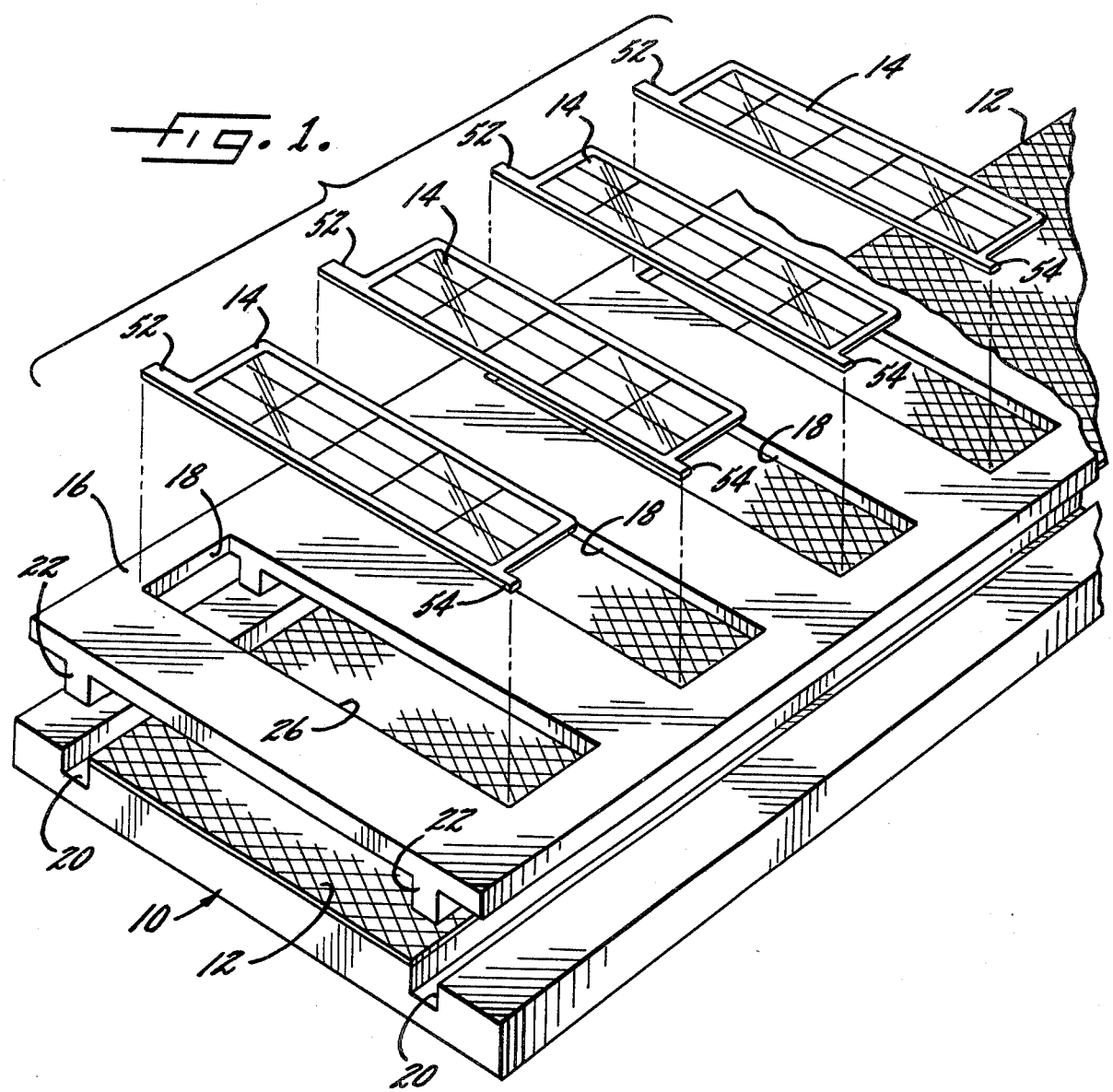
FIG. 1 is a partially exploded perspective view, illustrating the components employed to position a first set of electrode plates on the separator.
Figure 3:
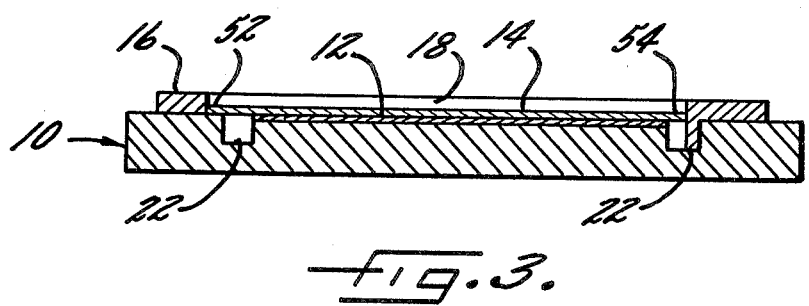
FIG. 3 is a cross-sectional view taken generally along the line 3—3 of FIG. 2.

Turning now to a more detailed description of the present invention, there is shown in the Figures a schematic assembly method for assembling the cell element stack in accordance with the present invention. The initial step involves providing a continuous strip of a separator material having predetermined dimensions, including an extended length of separator material as a free end, and then placing a first set of electrode plates of like polarity at predetermined locations on the separator material. To this end, and as is shown in FIG. 1 and in cross section in FIG. 3, a support member 10 is provided for receiving a continuous strip of a suitable separator 12. Proper positioning of a first set of electrode plates 14 of like polarity is achieved by using an alignment and plate positioning means such as a template 16 having open plate receiving areas 18. Proper positioning of the template 16 relative to the separator 12 is achieved by providing further alignment means. As shown, support member 10 thus includes a pair of channels 20 adjacent the edges of the separator. The channels 20 receive complementary shaped rails 22 on the bottom of the template 16 so that the template 16 will seat in its proper position relative to the separator 12 in preparation for the placing of the first set of electrode plates in the desired position. This likewise holds the separator in position for the insertion of the first set of plates.

In accordance with one important aspect of the present invention, the open electrode plate receiving areas 18 space th first set of electrode plates 14 in proper position for further assembly. More specifically, respective plates are appropriately spaced so that folding will be facilitated with the desired resulting alignment of the plates as will be described hereinafter.

Figure 2:
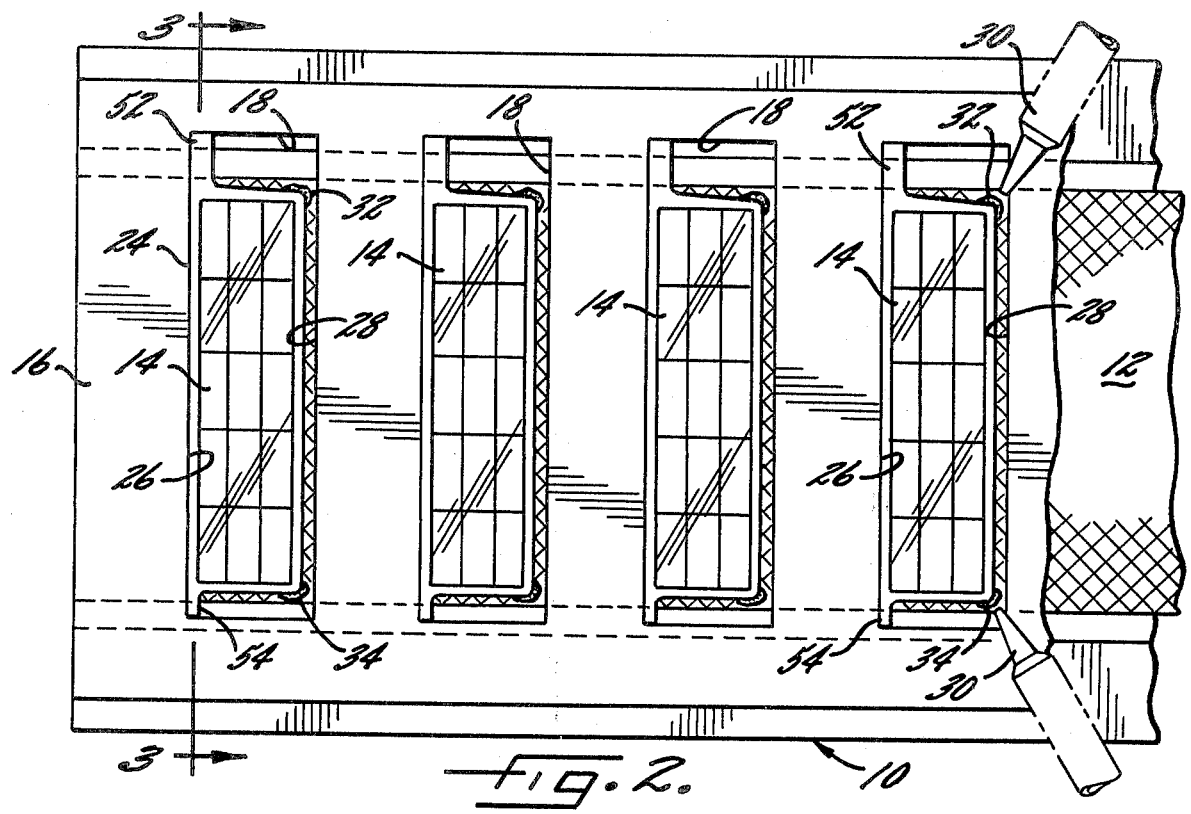
FIG. 2 is a partial top plan view, showing the first set of plates being secured to the separator after having been placed in proper position.

The first set of electrode plates are then placed in position as is shown in FIG. 2 by abutting the edge of the electrode plate 24 against edge 26 of the open electrode plate receiving areas 18. The dimensions of the open electrode plate receiving area 18 are preferably sized so that the top and bottom portions provide a snug fit with the extremities of the electrode plates on three sides. However, the other edge of the electrode plate receiving area 18, shown at 28, provides sufficient access for the plate-securing operation which will be discussed hereinafter. It will of course be understood that tolerances substantially closer than those illustrated in FIG. 2 would be expected in any automated operation.

Figure 4:
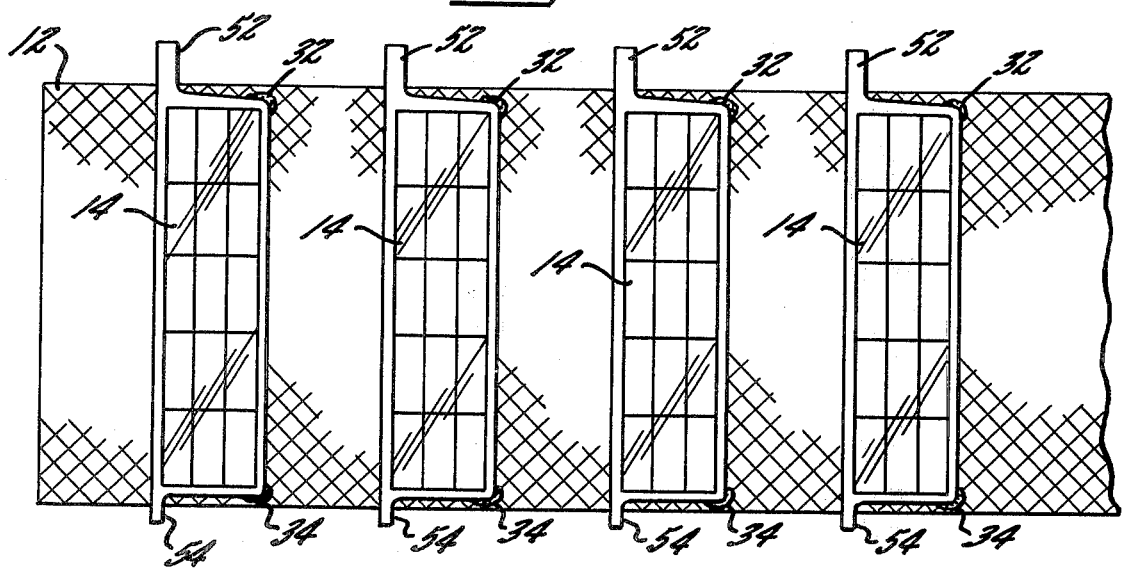
FIG. 4 is a partial top plan view, illustrating the first set of electrode plates secured in position on the separator after removal of the positioning means.

To this end, after being properly aligned, the first set of electrode plates 14 are secured to the separator 12 so that, in subsequent operations, the desired alignment will not be disturbed. As shown in FIG. 2, this may be satisfactorily accomplished by applying an adhesive via nozzles 30 from a source not shown. While a more extensive application could be carried out, if desired, it has been found satisfactory to merely apply beads of adhesive at areas shown generally at 32 and 34. In addition, it is desirable that the glue extend up to, but not beyond, the right edge of the plates 14 as illustrated in FIG. 2. FIG. 4 shows the first set of electrode plates 14 secured to the separator 12, after removal of the template 16.

Any suitable adhesive or other securing means for joining the electrode plates to the separator can be employed. As an illustrative example, it has been found satisfactory to use a rapid setting, hot melt adhesive such as polyamide or polyester formulations, which are commonly known.

Figure 5:
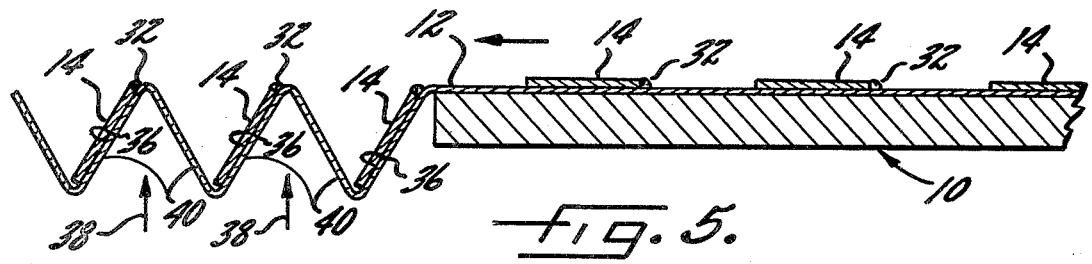
FIG. 5 is a partial side elevation view, showing the folding of the separator preparatory to placing the second set of electrode plates in position.

The separator with the first set of electrode plates secured in position may then be processed into the cell element stack by whatever sequence of steps is desired. Suitably, the separator may then be folded in accordion fashion to define first planar areas occupied by the attached plates and unoccupied folds which are defined by second planar areas, opposed to the first planar areas, for insertion of the second set of electrode plates of opposite polarity to the first plate set. The accordion folding operation is shown in FIG. 5 wherein the first set of electrode plates 14 define first planar areas 36 on the separator and the folding operation results in unoccupied folds shown generally 38 which are defined by second planar areas 40 for the second set of electrode plates. The presence of the first set of electrode plates facilitates the folding operation, and the selected spacing of such plates insures that the resulting cell element stack, when viewed from the top elevation, will be generally rectangular in configuration.

Figure 6:
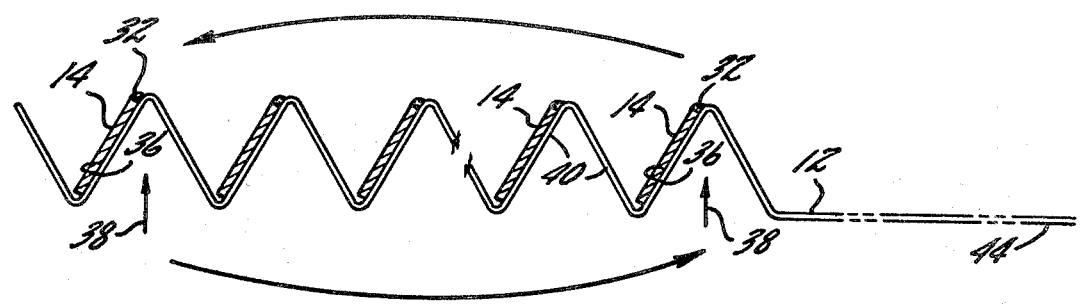
FIG. 6 is a partial side elevation view, schematically illustrating the rotation of the separator-plate assembly prior to insertion of the second set of electrode plates.
Figure 7:
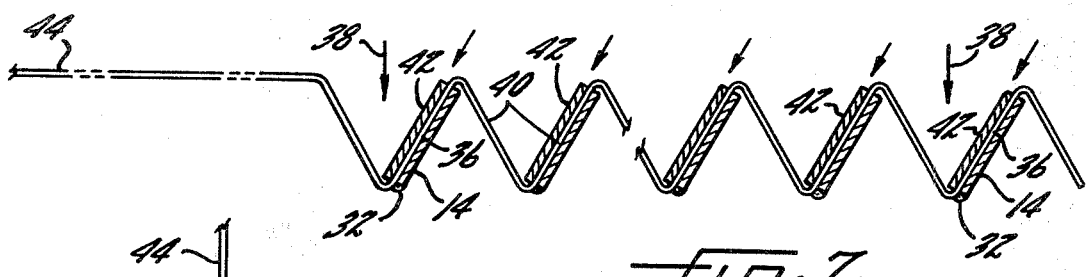
FIG. 7 is a partial side elevation view, showing the folded separator after the second set of electrode plates has been inserted into position.

The assembly is then completed by inserting a second set of electrode plates of opposite polarity to the first plate to occupy the second planar areas described. This can be accomplished by rotating the plate-separator assembly 180° about the longitudinal axis of the plate as shown in FIG. 6 or, in other words, turning the assembly upside down from the position shown in FIG. 5 to the position shown in FIG. 7. As can be thus seen in FIG. 7, the second set of electrode plates 42 has been placed in position in the fold defined by the second planar areas 40. At this point, the cell element stack is complete and can be inserted into the cell of a suitable container in the fashion described in the co-pending Klang et al application described herein.

However, in accordance with yet another aspect of the present invention, it is preferred to further process the cell element stack so that it can be subsequently handled with less possibility of displacing the two sets of positioned electrode plates. To this end, the separator and plate assembly is secured in such a fashion that the cell element stack can be handled as a single unit. This securing step can be carried out by any means desired and can likewise be either temporary or permanent.

Further, to obtain full utilization of all of the advantages of the Klang et al invention, the cell element stack may be snugly fit into the battery container. Accordingly, it may be useful to compress the cell element stack to the desired dimension and then to secure the stack in this configuration to insure that the proper dimension is retained.

Figure 8:
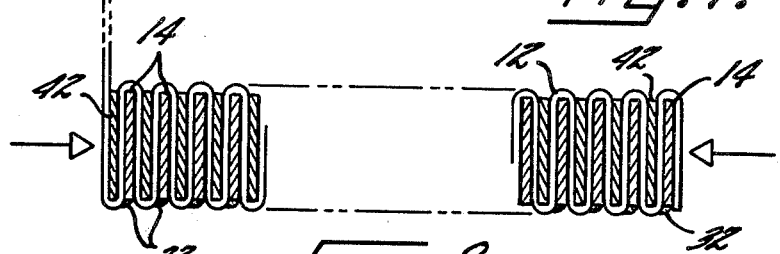
FIG. 8 is a partial top elevation, schematically illustrating the compression of the folded separator, with the two sets of electrode plates in position, into the desired cell element stack length.
Figure 9:
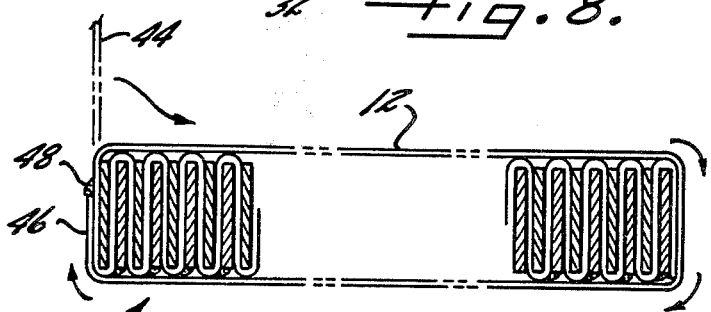
FIG. 9 is a partial top plan view, showing the wrapping of the free end of the separator about the element stack so as to maintain the desired dimensions.

To this end, and as is shown in FIGS. 8 and 9, the accordion-folded separator with the two sets of electrode plates in position is first compressed and is then secured in this position. Both of these steps can be carried out in any fashion desired. It has, however, been found suitable to carry out the compressing step by positioning one end of the cell element stack against a stationary surface and then compressing the element stack against that surface.

In accordance with a preferred aspect of the present invention, the compressed element stack is retained in this compressed condition by utilizing a free end of the separator material. More specifically, as is shown in FIGS. 8 and 9, the separator 12 is dimensioned so that, after the folding operation, a free end results which is sufficient in length to allow wrapping about the periphery of the cell element stack as is shown in FIG. 9. The terminal edge 46 of the free end 44 of the separator can then be secured to the wrapped portion, as by an application of an adhesive of the type, previously indentified, as is shown generally at 48.

It should be appreciated that, if desired, the second set of electrode plates 42 can likewise be secured to the separator 12 in the same or similar fashion as carried out with the first set of electrode plates 14. However, it has been found that a suitable stack can be readily provided by merely securing the first set of electrode plates to the separator. Automation for commercial production may well, however, make securing the second set of electrode plates desirable.

Figure 10:
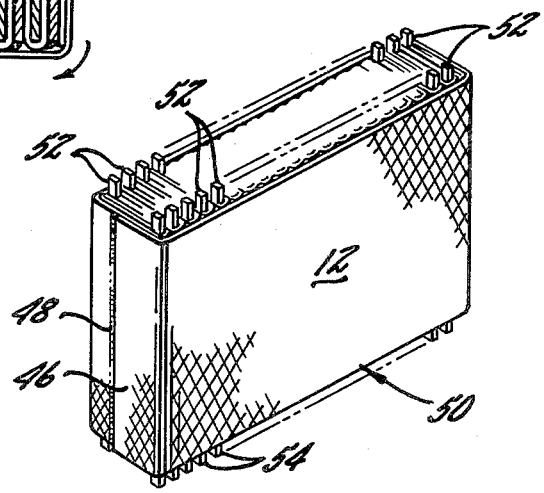
FIG. 10 is a partial perspective view of the assembled cell element stack.

The resulting, assembled cell element stack is shown generally at 50 in FIG. 10. The cell element 50 can readily be handled as a unit in any subsequent assembly steps required. For example, each electrode plate will generally have at least one electrical connection means such as a plate lug 52 as is shown in FIG. 10. These plate lugs 52 are in alignment in the element stack as are the feet 54 so that a conductive strap (not shown), together with the intercell connector component required, can be applied by any of the conventional techniques known. This may be accomplished either prior to insertion of the cell element into the battery container or after insertion into the battery container, as is more fully described in the Klang et al co-pending application identified herein.

It should be appreciated that the proper location and securing of the electrode plates to the separator, together with the compression step, aid in insuring that the plate lugs will be in proper attitude for a facile cast-on-strap application. In this regard, it may be useful to align the lugs of each set of electrode plates relative to one another during the assembly of the element stack.

Further, while use of the free end of the separator provides a facile means by which to secure the element stack in a fixed configuration, any other similar means, may be employed. Such means may be permanent as in the illustrative embodiment, or may be temporary (vis-.—removed prior to completion of assembly of the battery), as, for example, following a cast-on-strap operation carried out prior to insertion of the element into the cell.

As may be thus appreciated by those skilled in the art, the assembly steps shown are somewhat schematic in nature. However, the steps required are of the type which can be readily automated so as to be capable of use in a high volume commercial production effort. The method of this invention thus provides a ready means of assembling a relatively large number of plates and the necessary separator into a cell element stack, facilitating subsequent processing into a completed battery.

We claim:

1. A method of assembling an element stack of a lead-acid battery comprising:
   (a) providing a strip of separator material having predetermined dimensions, and providing pasted positive and negative electrode plates of predetermined dimensions;
   (b) placing said separator material in position to receive said electrode plates;
   (c) placing a first set of electrode plates of like polarity at predetermined locations on said separator material;
   (d) positively attaching said first set of electrode plates to said separator material;
   (e) folding said separator material with said attached electrode plates in accordion fashion along and adjacent the edges of said plates to form planar areas on said separator material occupied by said attached plates, and unoccupied folds on the opposite side of said separator material; and
   (f) loosely inserting a second set of electrode plates of opposite polarity to said first plate set in said unoccupied folds to complete said element stack.

2. A method of assembling an element stack of a lead-acid battery as set forth in claim 1, wherein said method includes the steps of providing encircling means and placing said encircling means about said assembled stack to secure the stack in folded condition and retain said loosely positioned second set of plates therein so as to facilitate subsequent handling of the stack.

3. A method of assembling an element stack of a lead-acid battery as set forth in claim 2, wherein said encircling means comprises a free end of said separator material and including the step of wrapping said free end in encircling relation about all sids of said assembled element stack.

4. A method of assembling an element stack of a lead-acid battery as set forth in claim 1, wherein said method includes the step of rotating said accordioned separator material with attached first set of electrode plates 180° to position the unoccupied folds in an upright position to facilitate the insertion of said second set of plates.

5. A method of assembling an element stack of a lead-acid battery as set forth in claim 3, wherein said method includes the steps of compressing said assembly of accordioned separator material with positive and negative plates positioned in the respective folds thereof into final assembled size prior to wrapping said free end of said material, and securing said free end to said element stack.

6. A method of assembling an element stack of a lead-acid battery comprising:
   (a) providing a strip of separator material having predetermined length and width dimensions, and providing pasted positive and negative electrode plates of predetermined dimensions;
   (b) placing said separator material in position to receive said electrode plates;
   (c) placing a first set of electrode plates of like polarity at predetermined locations on one side of said separator material;
   (d) positively attaching said first set of electrode plates to said separator material;
   (d) placing a second set of electrode plates of opposite polarity to said firt set of plates on the opposite side of said separator materials without securing said plates to said separator material;
   (f) folding said separator material in accordion fashion with said first set of electrode plates attached thereto and occupyin the folds on one side of said material and said second set of unsecured electrode plates occupying alternatively disposed folds on the other side of said material; and
   (g) securing the assembled stack in said folded condition to retain said unsecured second set of plates in place and to facilitate subsequent handling of the stack.

7. A method of assembling an element stack of a lead-acid battery as set forth in claim 6, wherein said method includes the steps of providing encircling means and securing said stack in folded and assembled condition by placing said encircling means about said stack.

8. A method of assembling an element stack of a lead-acid battery as set forth in claim 7, wherein said enricling means comprises a free end of the separator material and including the step of wrapping said free end in encircling relation about all sides of said assembled element stack.

9. A method of assembling an element stack of a lead-acid battery as set forth in claim 3, wherein said method includes the step of compressing said folded separator material with said positive and negative plates positioned in the respective folds thereof into finally assembled size prior to wrapping said free end of said separator material and securing same to said element stack.

* * * * *